United States Patent [19]

Bendler et al.

[11] Patent Number: 5,357,033

[45] Date of Patent: Oct. 18, 1994

[54] FILM FORMING AROMATIC ORGANIC POLYMERS HAVING ENHANCED DIELECTRIC CONSTANT VALUES AND METHOD FOR MAKING

[75] Inventors: John T. Bendler, Schenectady; Tohru Takekoshi; Clive W. Reed, both of Scotia, all of N.Y.

[73] Assignee: General Electric Company, Schenectady, N.Y.

[21] Appl. No.: 41,387

[22] Filed: Apr. 1, 1993

[51] Int. Cl.$^5$ .................. C08G 69/26; C08G 73/10
[52] U.S. Cl. .................. 528/353; 528/125; 528/128; 528/170; 528/172; 528/173; 528/174; 528/185; 528/188; 528/220; 528/229; 528/350
[58] Field of Search ............... 528/353, 125, 128, 170, 528/172, 173, 174, 220, 229, 188, 185, 350; 428/473.5

[56] References Cited

U.S. PATENT DOCUMENTS

| | | | |
|---|---|---|---|
| 3,850,885 | 11/1974 | Takekoshi et al. | 528/125 |
| 3,905,942 | 9/1975 | Takekoshi et al. | 528/185 |
| 3,989,670 | 11/1976 | Takekoshi et al. | 528/125 |
| 4,599,396 | 7/1986 | Takekoshi et al. | 528/185 |

FOREIGN PATENT DOCUMENTS 1026894 2/1978 Canada .
4077583 3/1992 Japan .

OTHER PUBLICATIONS

Article–Low Dielectric Thermoplastic Polyimide Resin, D. M. Stoakley et al, NASA Langley Research Ctr.—Quarterly 21(1), 3, Oct. 1989.
Article–446/ANTEC 1990—Low Dielectric Constant Polyimide Homopolymers and Copolymers for Electronic Applications, C. A. Arnold et al.
Article—Proc. 4th International Conf. on Polyimides, Soc. Plast. Eng., Nov. 1992, Ellenville, N.Y., P Session II—Posters 177—Dielectric Characterization of Fluorinated Polyimides, G. Hougham et al.
Abstract—113:60129k—Fluoro–Containing Polyimides and Their Manufacture, I. Maki et al–JP 02 60,933 [90 60,933] Mar. 1, 1990.
Abstract—113:98290u—Polyimides and Copolyimides as Interlayer Insulators and Coatings. Amoco Corp.–JP 02 60,934 [90 60,934] Mar. 1, 1990.

Primary Examiner—John Kight, III
Assistant Examiner—P. Hampton-Hightower
Attorney, Agent, or Firm—William A. Teoli; William H. Pittman

[57] ABSTRACT

Film forming aromatic organic polymers are provided having a dielectric constant greater than 3 resulting from the polymerization of aromatic organic monomers having orientable organic dipolar groups with a net dipole moment of at least 0.5 Debye. Among the aromatic organic polymers are included polyimides and polyetherimides having repeat main chain groups with orientable organic dipolar groups with non-symmetrically positioned polar radicals, such as fluoro and nitrile.

11 Claims, No Drawings

FILM FORMING AROMATIC ORGANIC POLYMERS HAVING ENHANCED DIELECTRIC CONSTANT VALUES AND METHOD FOR MAKING

The present invention relates to a method for making film forming aromatic organic polymers, such as polyimides having a dielectric constant greater than 3 and to the polymers obtained therefrom. More particularly, the present invention relates to the formation of film forming aromatic organic polymers by polymerizing a mixture of aromatic organic monomers which mixture includes aromatic organic monomers having at least one orientable organic dipolar group with a net dipole moment of at least 0.5 Debye.

Prior to the present invention, film forming aromatic organic polymers, such as polyimides, have been employed in a wide range of applications; polyimides can be readily formed into uniform films and possess excellent characteristics, such as outstanding mechanical strength, superior electrical properties, and high thermal and chemical stability. Polyimides also exhibit a high electrical breakdown strength, and their dielectric constant remains relatively unchanged over a wide range of temperatures up to their high glass transition temperature.

When self-supporting polymeric films are utilized for capacitance dielectric devices, important properties which are considered are electrical breakdown strength, dielectric constant, and low dielectric losses. As is generally known, the capacitance of such devices is proportional to the dielectric constant and inversely proportional to the thickness of the film for a given dimension and configuration. However, organic polymeric films formed from polymers with polar side groups, such as polytetrafluoroethylene, often have a reduced dielectric constant. In such instances, the dipoles have been found to neutralize each other because of the symmetric location of the polar groups along the polymer structure. The dielectric constant for rigid aromatic polyimides generally falls within a relatively narrow range of about 3 to 3.5. Despite the fact that the dipole moments of fluoro and fluoroalkyl groups are considered substantially above average, fluorinated polyimides have often been found to exhibit a lower dielectric constant than the corresponding non-fluorinated polyimides.

It would be desirable therefore to provide a method for enhancing the dielectric constants of film forming aromatic organic polymers, such as polyimides.

SUMMARY OF THE INVENTION

The present invention is based on the discovery that various aromatic organic monomers useful in the production of film forming aromatic organic polymers can be modified with internal organic dipolar groups having a net dipole moment of at least 0.5 Debye to provide film forming aromatic organic polymers having an enhanced dielectric constant. Optimum enhancement of the dielectric constant can be achieved if the organic dipolar groups introduced into such aromatic organic monomers are orientable. The term "orientable" means that the organic dipolar groups can freely alter their position about their axis of rotation in response to an applied AC or DC electric field, based on the presence of non-symmetrically substituted polar radicals such as fluoro or nitrile. In addition, the orientable organic dipolar groups can be bonded to an aromatic nucleus, an aliphatic connecting structural group, or an organic side chain or branch. An example of an orientable organic dipolar group with a non-symmetric polar radical is 2-fluoro-1,4-phenylene group as follows:

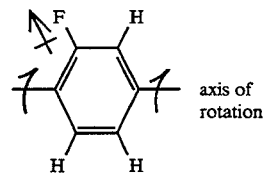

axis of rotation

STATEMENT OF THE INVENTION

There is provided by the present invention, a method for making a film forming aromatic organic polymer having a Tg in the range of from about 100° C. to 300° C. and a dielectric constant greater than 3, comprising, effecting reaction between aromatic organic monomers polymerizable to a film forming aromatic organic polymer under solvent casting or melt extrusion conditions, where among the aromatic organic monomers reacted, there is utilized at least 5 mole percent, based on the total moles of the aromatic organic monomers polymerized of aromatic organic monomers substituted with at least one orientable organic dipolar group having a net dipole moment of at least 0.5 Debye, which orientable organic dipolar group has at least one polar radical non-symmetrically positioned with respect to the axis of rotation of the organic dipolar group, where the polar radical is covalently bonded to a member selected from the group consisting of an aromatic nucleus, a branched aliphatic connecting structural unit, and an organic side chain or branch.

In a further aspect of the present invention, there is provided an aromatic organic polymer having a Tg in the range of from about 100°–300° C. and a dielectric constant greater than 3, where the aromatic organic polymer comprises at least 5 mole percent of main chain groups, based on the total moles of main chain groups in the aromatic organic polymer, possessing at least one internal orientable organic dipolar group having a net dipole moment of at least 0.5 Debye, which orientable organic dipolar group has at least one polar radical non-symmetrically positioned with respect to the axis of orientation of the organic dipolar group, where the polar radical is covalently bonded to a member selected from the group consisting of an aromatic nucleus, a branched aliphatic connecting structural unit, and an organic side chain or branch.

Some organic dipolar groups having at least one non-symmetrically positioned polar radical which can be introduced into aromatic organic monomers useful in making the film forming organic polymers of the present invention are for example,

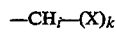

where X is a polar radical selected from the group consisting of —CN, —F, —Cl, —Br, —NO$_2$ and —CONH$_2$, and a mixture thereof, $i$ is equal to 1 or 2, $j$ is equal to 1 or 2, and the sum of $i + k$ is equal to 3.

Additional organic dipolar groups are,

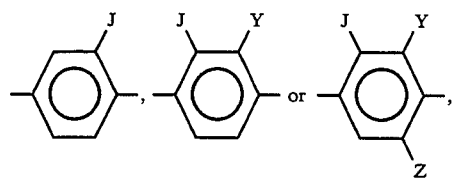
where J, Y and Z are the same or different polar radicals selected from —CN, —F, —Cl, —Br, —NO₂, —CONH₂, —CH₂F, —CHF₂, and a mixture thereof when more than one radical is present.
Some aromatic organic monomers which can be employed in the practice of the present invention are for example,
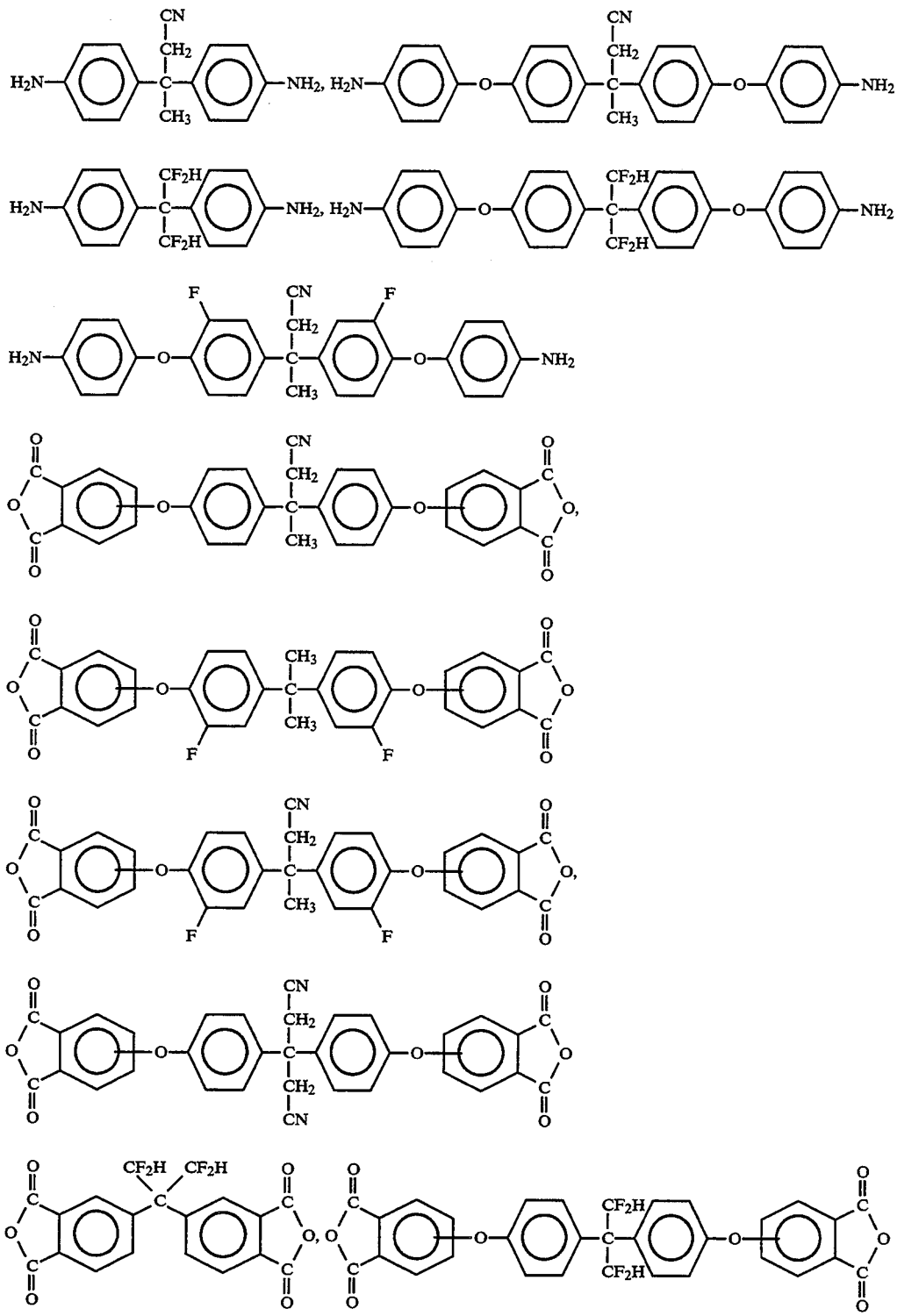

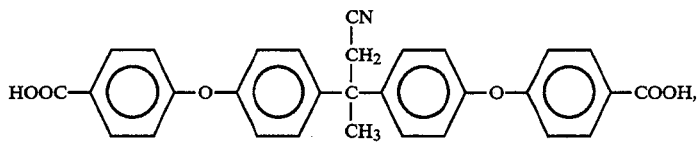

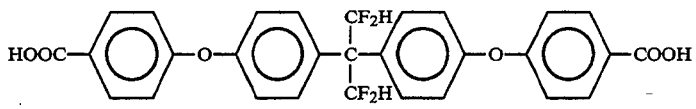

Also included are functional derivatives of the above monomers, such as silylated diamines, diisocyanates, esters and acid chlorides of dianhydrides and dicarboxylic acids.

Among the film forming aromatic organic polymers having repeat main groups with orientable organic dipoles which can be made in accordance with the practice of the present invention, there are included, polyimides, polycarbonates, polyesters, polyetherimides, polyethersulfones, etc. The film forming aromatic organic polymers made in accordance with the practice of the present intention can comprise at least 5 mole % and up to 100 mole % of the repeat main chain structural groups possessing at least one orientable organic dipolar group as previously defined. Among the aromatic organic polymers which can be made in the practice of the present invention, there are preferably included polyimides, or polyetherimides resulting from the condensation of an aromatic dianhydride and an aromatic diamine. Aromatic dianhydride and aromatic diamine having orientable dipolar groups can be used together or either can be used separately with appropriate organic dianhydride and organic diamine free of orientable dipolar groups, respectively. Some of the aromatic dianhydride free of orientable dipolar groups are shown by Takekoshi et al U.S. Pat. No. 3,803,085 incorporated herein by reference.

Some of the film forming aromatic organic polymers having repeat main chain groups with at least one orientable non-symmetric organic dipolar group with nitrile radicals are shown by the formulas,

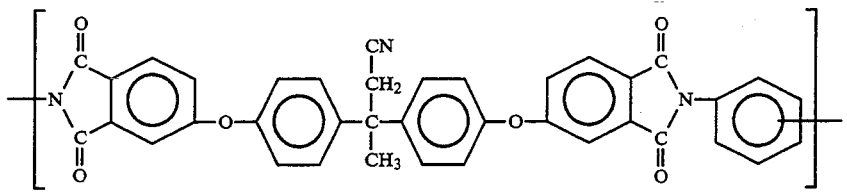

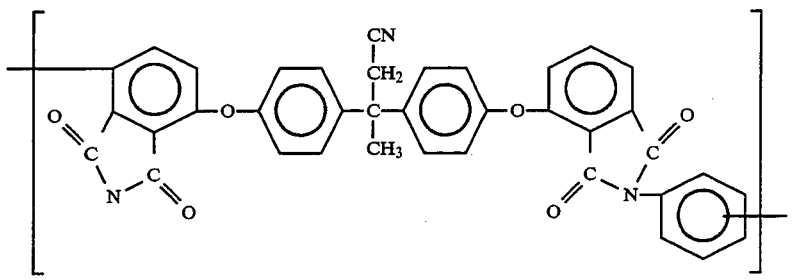

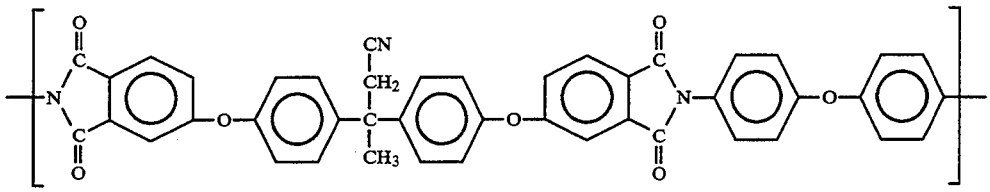

Film forming polymers having repeat main chain groups with at least one orientable organic dipolar group having non-symmetrically positioned fluorine radicals are shown by the formulas,

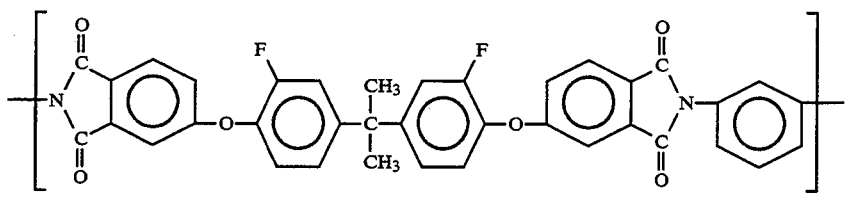

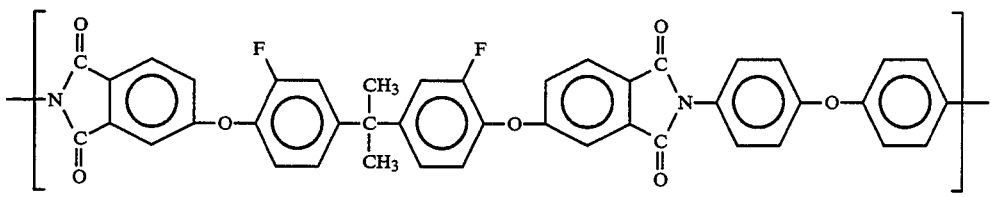

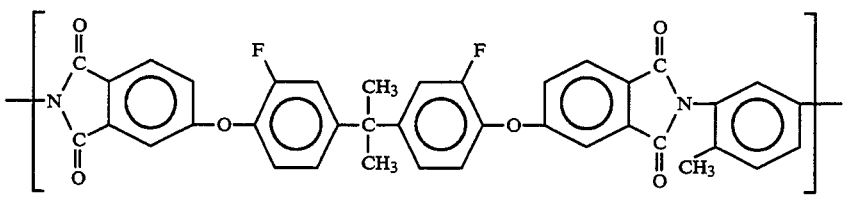

In addition to the above shown film forming aromatic polyimides, aromatic polyimides made in accordance with the practice of the present invention also can contain repeat main chain groups having a mixture of orientable organic dipolar groups with non-symmetrically positioned polar radicals such fluoro and nitrile such as shown by the formulas,

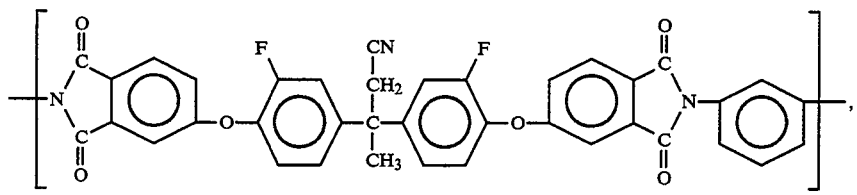

There are also included polyimides containing orientable organic dipolar groups on repeat main groups derived from the dianhydride and diamine as shown as follows,

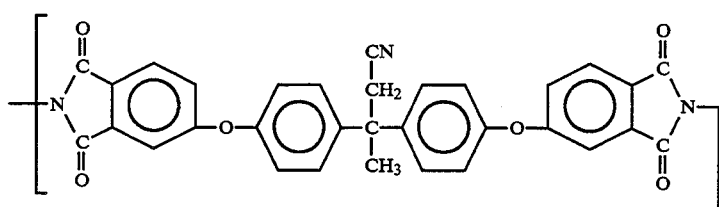
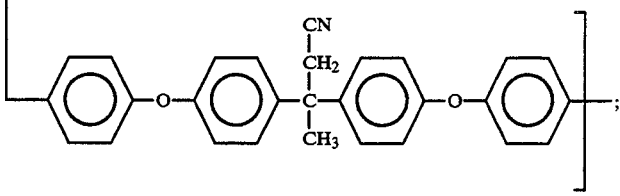

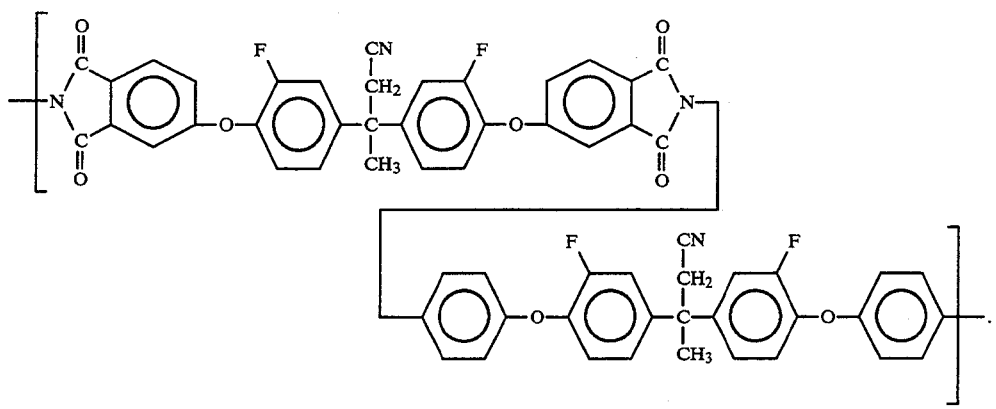

In order that those skilled in the art will be better able to practice the present invention, the following examples are given by way of illustration and not by way of limitation. All parts are by weight unless otherwise indicated.

EXAMPLE 1

A polyetherimide was prepared consisting essentially of repeat main chain groups having internal orientable 2-fluoro-1,4-phenylene groups. There were reacted 2,2-bis[3-fluoro-4-(3,4-dicarboxyphenoxy)phenyl]propane dianhydride and metaphenylenediamine. The mixture was maintained at 155°–160° C. and consisted of 4 g (7.118 mmol) of the dianhydride, 0.793 g (7.335 mmol) of metaphenylenediamine, 0.435 g (0.293 mmol) of phthalic anhydride, 15 ml of meta-cresol, and 5 ml of toluene. After 7 hours of heating the solution under reflux, it was cooled and diluted with 40 ml of methylene chloride and poured into 400 ml of methanol stirred in a blender. A white fibrous precipitate was obtained which was filtered, washed with methanol and dried under vacuum. There was obtained 4.49 g (98.3%) yield, of product having an intrinsic viscosity of 0.33 dl/g (25° C., $CHCl_3$). Based on method of preparation, the product was a polyetherimide containing 2-fluoro-1,4-phenylene linkages. The polyetherimide had a Tg of 211° C., TGA (5% loss) 520° C. (nitrogen) and 514° C. (air).

The dianhydride containing 2-fluoro-1,4-phenylene group used in preparing the above described polyetherimide was prepared by initially forming a fluoro bisphenol such as, 2,2-bis(3-fluoro-4-hydroxyphenyl) propane which was converted to the corresponding bis (N-methylphthalimide) ether, which was in turn hydrolyzed to the corresponding bisfluoroetherdianhydride. The fluoro bisphenol was prepared as follows:

2-Fluorophenol (64.87 g. 0.579 mol) and acetone was placed in a 300 ml, 3-necked flask. The mixture was stirred and cooled to 10° C. Approximately 6 g of boron trifluoride gas was introduced into the mixture through a gas inlet tube over a period of one hr. The solution was further stirred at room temperature for additional 8 hr. The reaction mixture was quenched by addition of approximately 100 g of crushed ice. The resulting mixture was extracted with 200 ml of ether. The ether solution was washed with water and evaporated under vacuum. The residual oil was distilled under vacuum and collected a fraction boiling at 148°–150° C./0.5 mmHg. The distillate was then recrystallized from a 2:1 mixture of toluene and cyclohexane. Based on method of preparation the product was 2,2-bis(3-fluoro-4-hydroxyphenyl)propane. The yield of the pure product was 32.3%, mp=99°–100° C. The identity of the product was further confirmed by IR(KBr; cm$^{-1}$); 3380(OH), 1600 (arom), 1518(C—O). $^1$H nmr (ppm in DMSO-d$_6$): CH$_3$(s) 1.52(6), H$_{arom}$ 6.77–6.91(6), OH(s) 9.60(2). $^{13}$C nmr (ppm in DMSO-d$_6$): C$^1$(d) 141.87 (J$_{C,F}$=5.6 Hz), C$^2$(d) 114.21 (J$_{C,F}$=18.5 Hz), C$^3$(d) 150.53 (J$_{C,F}$=240.4 Hz), C$^4$ 142.49 (J$_{C,F}$=13.0 Hz), C$^5$(d) 117.21 (J$_{C,F}$=3.7 Hz), C$^6$ 41.16, C$^8$ 30.40.

The corresponding bis (N-methylphthalimide) was prepared as follows:

Sodium metal (1.819 g 0.0790 mol) was reacted with methanol in 40 ml of absolute methanol under nitrogen atmosphere and 10.449 g, (03954 mol) of the above fluoro bisphenol was added to the methanol solution. The resulting mixture was stirred and heated until a homogeneous solution resulted. The heating was continued under a stream of nitrogen to evaporate the majority of the methanol. The thick solution was diluted with 50 ml of dry toluene. The resulting slurry was cooled and filtered. The crystalline solid of the sodium salt was transferred into a drying tube and the tube was heated under vacuum at 200° C. for one hr until a vacuum of 0.05 torr was reached. The yield of the sodium salt was 12.0 g (98.5%).

A mixture of 40 ml of N,N-dimethylacetamide and 4-nitro-N-methylphthalimide (8.72 g, 0.0423 mol) was stirred under nitrogen atmosphere and there was added (6.52 g, 0.02115 mol) of the above sodium salt. The mixture was further stirred and heated for 2.5 hr at 70° C. The mixture was poured into iced water and the grey solid was collected and dried. The crude product was dissolved in 100 ml of toluene and the solution was repeatedly extracted with 3% aqueous potassium hydroxide solution until impurities were completely removed as evidenced by the HPLC analysis. The toluene solution was then evaporated under vacuum to obtain a light amber oil. The residue was dissolved in 4 ml of toluene and then diluted with 20 ml of cyclohexane. The product crystallized which was filtered, washed with methanol and dried. Based on method of preparation, there was obtained, 2,2-bis[3-fluoro-4-(N-methylphthalimide-4-oxy)phenyl]propane. The yield was 8.32 g (65.5%), mp=130.5°–132° C.; IR(KBr; cm$^{-1}$); 1772, 1712 (C=O), 1506(C-N). $^1$H nmr (ppm in DMSO-d$_6$): C-CH$_3$(s) 1.71(6), N-CH$_3$(s) 2.99, H$_{arom}$ 7.16–7.85. $^{13}$C nmr (ppm in DMSO-d$_6$): C$^1$(d) 149.12 (J$_{C,F}$=5.5 Hz), C$^2$(d) 115.83 (J$_{C,F}$=18.5 Hz), C$^3$(d) 153.21 (J$_{C,F}$=247.8 Hz), C$^4$ 138.91 (J$_{C,F}$=11.1 Hz), $C^5(d)$ 121.01, $C^6$ 123.98, $C^7$ 161.99, $C^8$ 110.19, $C^9$ 123.61, $C^{10}$ 126.04, $C^{11}$ 125.32, $C^{12}$ 122.74, $C^{13,14}$ 167.18, 167.32, $C^{15}$ 23.84, $C^{16}$ 42.56, $C^{17}$ 30.06.

The above bis (N-methylphthalimide) was then hydrolyzed to the corresponding dianhydride as follows:

In a 300 ml, 3-necked flask were placed 7.5 g (0.115 tool) of potassium hydroxide pellets (86%) and 60 ml of water. The solution was stirred under nitrogen and 13.46 g (0.0231 mol) of the above bisimide was added along with 3 ml of methanol. The reaction mixture was stirred and heated to reflux for two weeks. The reaction mixture was filtered and filtrate was acidified with 200 ml of iced water containing 15 ml of 35% hydrochloric acid. A tacky resinous precipitate of the tetra acid did not crystallize. The entire mixture was subjected to a continuous ether extraction. The ether solution was evaporated under vacuum and the residual crude tetra acid was dissolved in 30 ml of acetic acid. The solution was combined with 18 ml of acetic anhydride and heated to reflux for 45 min. A white precipitate was obtained which was filtered and dried. Based on method of preparation the product was 2,2-bis[3-fluoro-4-(3,4-dicarboxyphenoxy)phenyl]propane dianhydride. The yield of dianhydride was 8.51 g (66.3%) mp=148.5°-149° C. The above filtrate was concentrated and diluted with 10 ml of cyclohexane. Additional 3.36 g (26.1%) of the dianhydride was obtained, mp=149°-150° C. The dianhydride was recrystallized from toluene, mp=150.5°-151.5° C. FT-IR (cm$^{-1}$); 1853 (C=O), 1785 (C=O); $^{13}$C nmr (ppm in DMSO-d$_6$): $C^1(d)$ 149.54 ($J_{C,F}$=5.6 Hz), $C^2(d)$ 115.96 ($J_{C,F}$=18.5 Hz), $C^3(d)$ 153.14 ($J_{C,F}$=246.0 Hz), $C^4$ 138.44 ($J_{C,F}$=13.0 Hz), $C^5(d)$ 122.87, $C^6$ 123.40, $C^7$ 163.32, $C^8$ 111.61, $C^9$ 134.23, $C^{10}$ 125.24, $C^{11}$ 127.90, $C^{12}$ 124.17, $C^{13,14}$ 162.38, 162.54, $C^{15}$ 42.66, $C^{16}$ 30.07.

EXAMPLE 2

A polyetherimide having orientable nitrile containing dipolar groups was prepared by effecting reaction between 3,3-bis[4-(N-2-pyridylphthalimide-4-oxy)-phenyl]butyronitrile, referred to hereinafter as "bisimide" and m-phenylenediamine in accordance with the following procedure:

A mixture of 2.7907 g (4.000 mmol) of bisimide, 0.4326 g (4.000 mmol) of m-phenylenediamine, and 15 ml of o-dichlorobenzene was placed in a 50 ml, 3-necked flask under nitrogen. The mixture was heated to reflux at 180° C. for 3 hr. The equilibrated reaction mixture was cooled to 70° C. and 30 ml of methanol was added to effect the precipitation of product. The mixture was cooled to room temperature and additional 100 ml of methanol was added to complete the precipitation. The product was filtered to remove the 2-aminopyridine, washed with methanol and dried, the yield was 2.586 g (104.6% based on the complete exchange). The dried product and 4.3 mg (1 mole %) of m-phenylenediamine were placed back in the flask together with 10 ml of o-dichlorobenzene and 3 ml of N-methylpryrrolidone. The solution was reheated at 180° C. for additional 1.5 hr to re-equilibrate. The product was precipitated in methanol and dried, yield 2.336 g (94.6%). The product was again re-equilibrated in the presence of additional 1 mol% of m-phenylenediamine by heating the solution in a mixture of 5 ml of N-methylpryrrolidone and 10 ml of o-dichlorobenzene for additional 2 hr. The final product was precipitated in methanol and dried. Based on method of preparation the product was a polyetherimide having orientable non-symmetrically substituted cyanomethyl dipolar groups. The yield of the product was 2.242 g (90.8%), intrinsic viscosity 0.32 dl/g (in CHCl$_3$). FT-IR(cm$^{31}$ $^1$): 2245 (CN), 1778 and 1723 (C=O); Tg=226° C; TGA (5% loss) 456° C. (N$_2$), 456° C. (air).

The bisimide used in preparing the above polyetherimide was prepared by a series of reactions involving the initial synthesis of a bis(hydroxyphenyl)butyramide, the conversion of the bis(hydroxyphenyl)butyramide to the corresponding bis(acetoxyphenyl)butyramide, the conversion of the butyramide to the corresponding bis(hydroxyphenyl)butyronitrile, and the corresponding disodium salt, followed by the reaction of the disodium salt with N-(2-aminopyridyl)-4-nitrophthalimide.

The 3,3-bis(4-hydroxyphenyl)butyramide was prepared as follows:

A mixture of 63.3 g, (0.6735 mol), of phenol, 8.51 g, (0.0842 mol) of acetoacetamide and 40 ml of trifluoroacetic acid was placed in a 500 ml, 3-necked flask equipped with a gas inlet tube and a condenser. The mixture was stirred under nitrogen and BF$_3$ gas was introduced while the reaction temperature was maintained at 20° C. A total of 17.6 g of BF$_3$ gas was added over a period of 3 hr. The reaction mixture was diluted with 200 ml of ether and the ether solution was washed with water three times. The ether and excess phenol were removed under vacuum maintaining the temperature below 90° C. When the viscous residue was dissolved in 50 ml of methanol, a white precipitate formed. The white solid was filtered, washed with cold methanol and dried. Based on method of preparation, there was obtained 3,3-bis(4-hydroxyphenyl)butyramide referred to below as "bisphenol". The yield of the product was 13.47 g (59.0%), mp=216°-216.5° C. $^1$H nmr (ppm in DMSO-d$_6$): C-CH$_3$(s)1.71(3), CH$_2$(s) 2.79(2), NH$_2$ 6.50 & 6.85(2), H$_a^{arom}$(d) 6.95(J=8.55$_{Hz}$(4), H$_b^{arom}$(d) 6.85 (J=8.54$_{Hz}$) (4), OH(s) 9.12 (2). $^{13}$C nmr(ppm in DMSO-d$_6$): $C^1$ 139.94, $C^2$ 127.83, $C^3$ 114.49, $C^4$ 154.94, $C^5$ 43.68, $C^6$ 28.25, $C^7$ 46.83 $C^8$ 172.56.

The 3,3-bis(4-acetoxyphenyl)butyramide was prepared as follows:

A mixture of 17.3 g, (0.06377 mol), of the above bisphenol, 50 ml of acetic acid and 25 ml of acetic anhydride were placed in a 50 ml Erlenmeyer flask. The mixture was stirred and 2 drops of conc. sulfuric acid was added. The temperature slowly rose to 32° C. over a period of 15 min. The reaction mixture was further heated at 60°-65° C. for 4 hr. The solution was condensed under a vacuum of 1 mmHg. The viscous residue was diluted with 20 ml of chloroform and the chloroform solution was allowed to stand overnight. A small portion of the white crystalline precipitate was isolated for characterization and the rest of the resulting amide-diacetate was used for next reaction without further purification, mp=159°-160° C. $^1$H nmr (ppm in DMSO-d$_6$): C-CH$_3$(s)1.82(3), COCH$_3$(s) 2.23(6), CH$_2$(s) 2.93(2), NH$_2$ 6.60 & 7.08(2), H$_a^{arom}$(d) 7.00(4), H$_b^{arom}$(d) 7.20(4). $^{13}$C nmr(ppm in DMSO-d$_6$): $C^1$ 146.33, $C^2$ 127.92, $C^3$ 121.02, $C^4$ 148.31, $C^5$ 27.79, $C^6$ 44.49, $C^7$ 46.08, $C^8$ 171.94, $C^9$ 20.85, $C^{10}$ 169.18.

The 3,3-Bis(4-hydroxyphenyl)butyronitrile was prepared as follows:

To the crude chloroform solution of the above amide-diacetate, were added 9 ml of phosphorous oxychloride and 10 ml of chloroform. The resulting mixture was heated to reflux at 75° C. for 2.5 hr. The solution was separated by decantation from resinous residue and quenched by pouring on to 100 g of crushed ice. The resulted mixture was diluted with 100 ml of ether and neutralized by addition of solid sodium bicarbonate. The ether layer was washed with 2% aqueous sodium carbonate and then water. The HPLC analysis indicated the diacetate was partially hydrolyzed. The ether solution was evaporated under vacuum and the viscous residue was dissolved in 25ml of methanol. A mixture of 1.5 g of 50% sodium hydroxide and 5 ml of water was added to the methanol solution. The reaction mixture was stirred at room temperature for 2 hr and it was neutralized by addition of 1.5 ml of conc. hydrochloric acid. The methanol was removed under vacuum and the residue was dissolved in 150 ml of ether. The ether solution was extracted with 3% aqueous sodium carbonate solution to remove acidic impurities. The ether solution was washed with water and evaporated under vacuum to leave a resinous residue. The crude product had a purity of only 75% by HPLC analysis, yield 15.5 g. The crude product (10.4 g) was distilled under vacuum and a fraction boiling at 235°–240° C./0.03 mmHg was collected, the yield 7.13 g. The distillate was triturated in chloroform. A white crystalline product was obtained. Based on method of preparation the product was 3,3-bis(4-hydroxyphenyl)butyronitrile; yield 6.5 g, mp=154°–156° C. $^1$H nmr (ppm in DMSO-d$_6$); C-CH$_3$(s) 1.70(3), CH$_2$(s) 3.25(2), H$_a{}^{arom}$(d) 6.66(J=8.79$_{Hz}$) (4), H$_b{}^{arom}$(d) 7.01(J=8.30$_{Hz}$) (4), OH(s). 9.29(2). $^{13}$C nmr(ppm in DMSO-d$_6$): C$^1$ 137.13, C$^2$ 114.81, C$^3$ 127.64, C$^4$ 155.65, C$^5$ 30.68, C$^6$ 43.38, C$^7$ 47.97, C$^8$ 119.41.

The disodium salt of 3,3-bis(4-hydroxyphenyl)-butyronitrile, or "bisphenol nitrile" was prepared as follows:

There was reacted 1.1485 g, (49.94 mmol) of sodium metal with 18 ml of absolute methanol under nitrogen atmosphere. After the complete reaction of the sodium metal, 6.3248 g, (24.97 mmol) of the bisphenolnitrile was added. The mixture was stirred and heated under a stream of nitrogen. When most of the methanol was evaporated, the residual solid was transferred into a drying tube and the tube was heated under vacuum at 140° C. for 4 hr until a vacuum of 0.03 Torr was reached. The yield of the salt was 99.3%.

The 3,3-Bis[4-(N-2-pyridylphthalimid-4-oxy)phenyl]-butyronitrile was prepared as follows:

To a mixture of 3.44 g, (11.57 mmol) of the above disodium salt and N-(2-pyridyl)-4-nitrophthalimide 6.23 g, (0.2314 mol) was added 25 ml of dimethylsulfoxide under nitrogen atmosphere. The mixture was stirred and heated to 65° C. for 1.5 hr. The mixture was poured into 150 ml of iced water. A precipitate was formed which was filtered and washed with water. The wet cake was slurried into 150 ml of water. The slurry was stirred for 2 hr and filtered. A light tan solid was obtained which was dried under vacuum. Approximately half or 4.6 g of the crude sample was dissolved in 15 ml of tetrahydrofuran; it was purified by medium pressure livid chromatography using 50 mm ID×40 cm LC column packed with silica gel and ethyl acetate/hexane eluents. A colorless crystalline solid was isolated from the main fraction; yield 3.07 g, mp=205°–208° C. $^1$H nmr (ppm in DMSO-d$_6$): C-CH$_3$(s) 1.81(3), CH$_2$(s) 3.28(2), H$_{arom}$7.15–8.88(22) $^{13}$C nmr(ppm in DMSO-d$_6$): C$^1$ 143.14, C$^2$ 128.99, C$^3$ 119.86, C$^4$ 153.31, C$^5$ 192.72, C$^6$ 111.97, C$^7$ 134.11, C$^8$ 125.33, C$^9$ 124.08, C$^{10}$ 122.96, C$^{11,12}$ 165.71, 165.79, C$^{13}$ 145.88, C$^{14}$ 149.42, C$^{15}$ 126.18, C$^{16}$ 138.69, C$^{17}$ 123.37

EXAMPLE 3

Films were cast from the 2-fluoro-1,4-phenylene-containing polyetherimide of example 1 and the cyanomethyl substituted polyetherimide of example 2 using chloroform as the solvent. The films were vacuum desiccated to remove residual solvent. The dielectric constants of the films were measured over a 100 Hz to 10 kHz range. The dielectric constants are shown in the following table, which includes as a comparison Ultem ® 1000 polyetherimide, a thermoplastic manufactured by the GE Plastics Division:

| Polyptherimide | Dialectric Constant 1 kHz |
| --- | --- |
| Ultem ® 1000 | 2.97 |
| 2-fluoro-1,4-phenylene substituted | 3.44 |
| cyanomethyl substituted | 7.80 |

The above results show that polyetherimides having enhanced dielectric constant values can be made in accordance with the practice of the present invention.

Although the above examples are directed to only a few of the very many variables which can be employed in the practice of the method of the present invention and to the film forming aromatic organic polymers having enhanced dielectric constant made by such method, it should be understood that the present invention is directed to a much broader variety of film forming aromatic organic polymers having orientable organic dipolar groups and method for making which are shown in the description preceding these examples.

What is claimed is:

1. A method for making a film forming aromatic organic polymer having a Tg in the range of from about 100° C. to 300° C. and a dielectric constant greater than 3, comprising polymerizing under solvent casting or melt extrusion conditions, a mixture of aromatic organic monomers having at least two reactive functional groups selected from the group consisting of amino, anhydride, and carboxy, and derivatives thereof, selected from the group consisting of silylated amino, isocyanto, anhydride acid chloride, and carboxylic acid chloride, where among the aromatic organic monomers reacted, there is utilized at least 5 mole percent, based on the total moles of the aromatic organic monomers polymerized, aromatic organic monomers substituted with at least one orientable organic dipolar group having a net dipole moment of at least 0.5 Debye, and selected from the group consisting of,

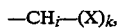

where X is a polar radical selected from the group consisting of —CN, —F, —Cl, —Br, —NO$_2$ and —CONH$_2$, and a mixture thereof, i is equal to 1 or 2, k is equal to 1 or 2, and the sum of i+k is equal to 3, and, a member selected from the group consisting of,

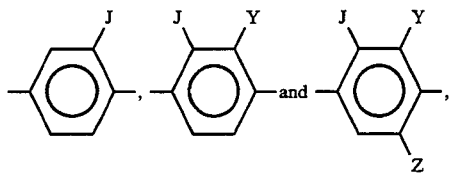

where J, Y and Z are the same or different polar radicals selected from the group consisting of —CN, —F, —Cl, —Br, —NO$_2$, —CONH$_2$, —CH$_2$F, —CHF$_2$, and a mixture thereof.

2. A film forming aromatic organic polymer having a Tg in the range of from about 100° C. to 300° C. and a dielectric constant greater than 3, comprising a condensation reaction product of a mixture of aromatic organic monomers having at least two reactive functional groups selected from the group consisting of amino, anhydride, and carboxy, and derivatives thereof, selected from the group consisting of silylated amino, isocyanto, anhydride acid chloride, and carboxylic acid chloride, where among the condensed aromatic organic monomers, there is present at least 5 mole percent, based on the total moles of aromatic organic monomers, aromatic organic monomers substituted with at least one orientable organic dipolar group having a net dipole moment of at least 0.5 Debye, and selected from the group consisting of,

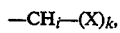

where X is a polar radical selected from the group consisting of —CN, —F, —Cl, —Br, —NO$_2$ and —CONH$_2$, and a mixture thereof, i is equal to 1 or 2, k is equal to 1 or 2, and the sum of i+k is equal to 3, and, a member selected from the group consisting of,

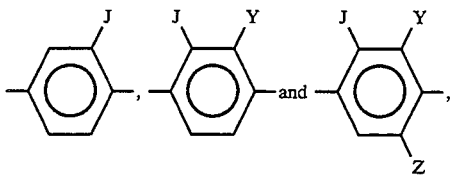

where J, Y and Z are the same or different polar radicals selected from the group consisting of —CN, —F, —Cl, —Br, —NO$_2$, —CONH$_2$, —CH$_2$F, —CHF$_2$, and a mixture thereof.

3. A method in accordance with claim 1, where the film forming aromatic organic polymer is an aromatic polyetherimide.

4. A method in accordance with claim 1, where the organic dipolar group containing organic monomer polymerized has at least one orientable organic dipolar group which contains at least one non-symmetrically substituted fluoro radical.

5. A method in accordance with claim 1, where the organic dipolar group containing organic monomer polymerized has at least one orientable organic dipolar group which contains at least one non-symmetrically positioned nitrile radical.

6. A method in accordance with claim 1, where the organic dipolar group containing aromatic organic monomers which are polymerized are selected from aromatic organic monomers substituted with different non-symmetrically positioned polar radicals.

7. A method in accordance with claim 6, where the polar radicals are fluoro, and nitrile.

8. A polyetherimide in accordance with claim 1.

9. An aromatic organic polymer in accordance with claim 1, where the polar radicals are fluoro.

10. An aromatic organic polymer in accordance with claim 1, where the polar radicals are nitrile.

11. An aromatic organic polymer in accordance with claim 1, where the polar radicals are a mixture of fluoro and nitrile.

* * * * *